United States Patent [19]

Gupta

[11] 4,112,130
[45] Sep. 5, 1978

[54] SPRAY DRYING OF ORANGE JUICE

[75] Inventor: Ashis S. Gupta, Marietta, Ga.

[73] Assignee: The Coca-Cola Company, Atlanta, Ga.

[21] Appl. No.: 621,716

[22] Filed: Oct. 14, 1975

[51] Int. Cl.$^2$ ............................................. A23L 2/10
[52] U.S. Cl. .................................... 426/471; 426/599; 426/658
[58] Field of Search ............... 426/471, 599, 658, 285; 159/4 D, 48 R

[56] References Cited

U.S. PATENT DOCUMENTS

| 1,800,501 | 4/1931 | Bornegg | 426/471 X |
| 2,077,819 | 4/1937 | Zizinia | 426/471 X |
| 2,367,131 | 1/1945 | Leo et al. | 426/471 X |
| 2,703,139 | 3/1955 | Rappleyea | 159/4 D |
| 2,835,597 | 5/1958 | Barzelay | 426/471 |
| 2,842,193 | 7/1958 | Ballestra | 159/4 D |
| 3,621,902 | 11/1971 | Okada | 426/471 X |
| 3,738,412 | 6/1973 | Nezbed et al. | 426/471 X |
| 3,798,342 | 3/1974 | Huste | 426/471 |

FOREIGN PATENT DOCUMENTS

| 213,856 | 3/1958 | Australia | 159/4 D |
| 552,475 | 4/1943 | United Kingdom | 159/4 D |
| 575,118 | 2/1946 | United Kingdom | 426/471 |

OTHER PUBLICATIONS

"Spray Drying", an article in Industrial and Engineering Chemistry, vol. 30, No. 12, pp. 1372–1384, Dec. 1938.
Food Dehydration edited by Van Arsdel et al., published by Avi Pub. Co., Westport, Conn, 1973 pp. 211–215, vol. 2.
Food Processing, Oct. 1973, p. 68, 426–471.
MCP Foods, Inc., Technical Data.

*Primary Examiner*—Robert Halper
*Attorney, Agent, or Firm*—John R. Martin; Robert A. Lester; Michael J. Gilroy

[57] ABSTRACT

Method for producing a free-flowing orange juice powder having improved flavor including (a) providing an aqueous slurry having up to about 65% solids, about 50–85% of which is orange juice with the balance being a food grade, water-dispersible or water-soluble drying aid and (b) cocurrently spray drying the slurry to a powder having an average moisture content of less than about 4% under carefully controlled drying conditions. The dryer inlet and outlet air temperatures are maintained at about 220°–300° F and about 145°–205° F, respectively. The spray dryer nozzle pressure is suitably less than about 5,000 psig with the slurry feed rate through each nozzle being less than about 45 gph. The interior walls of the spray dryer are maintained at a temperature of less than the sticky point temperature of the dried powder, preferably less than about 135° F. Advantageously, the angle of spray drying and size of the drying chamber are selected in conjunction with the nozzle pressure to minimize any build up of undried orange juice powder on the walls of the dryer.

37 Claims, 1 Drawing Figure

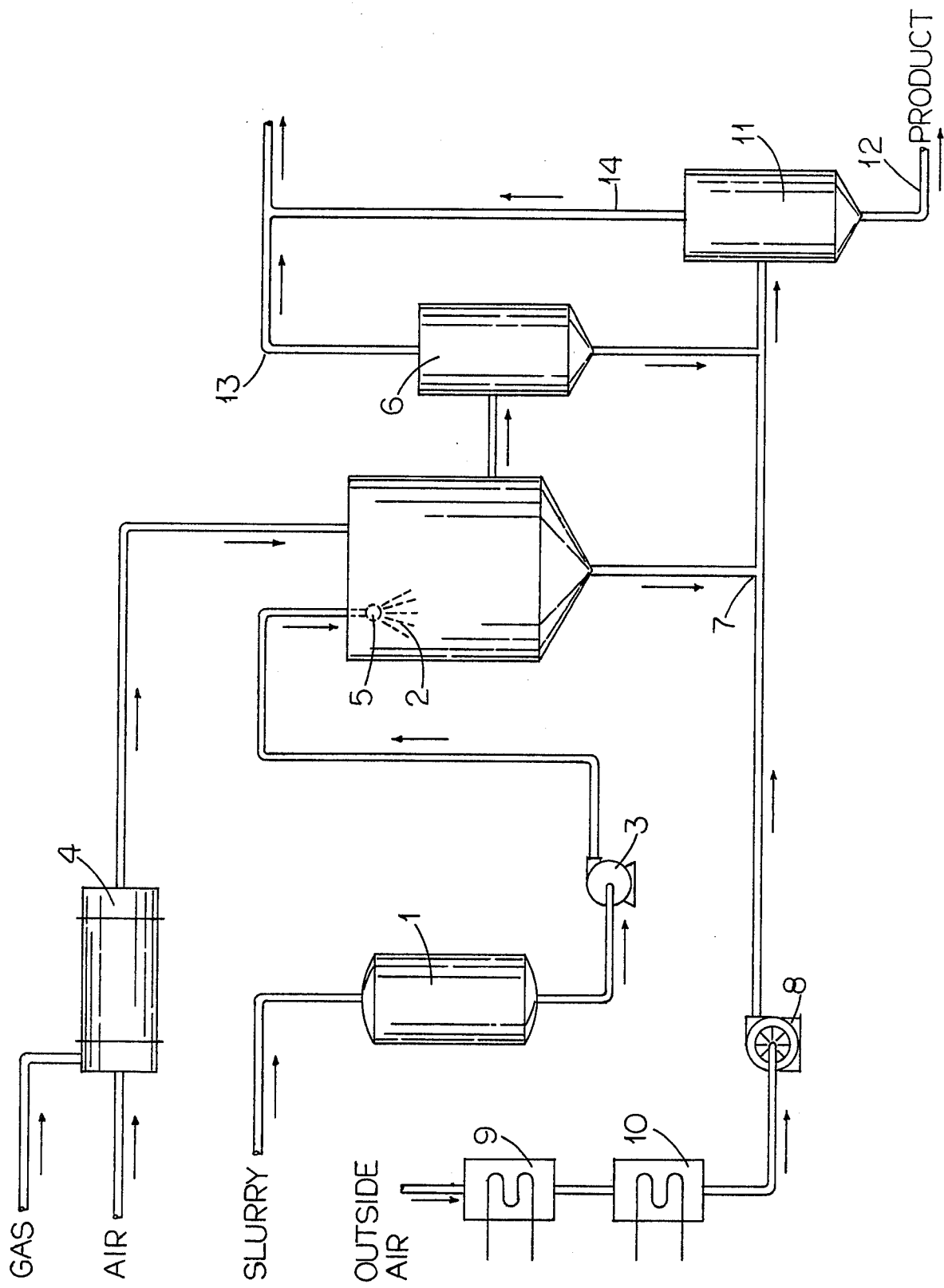

SPRAY DRYING OF ORANGE JUICE

BACKGROUND OF THE INVENTION

This invention is concerned with a process for producing a high quality, spray-dried orange juice powder. It specifically pertains to a combination of unique spray drying parameters which yield a free-flowing orange juice powder having superior organoleptic characteristics.

Spray drying has long been advocated as a process for commercially dehydrating food materials. Such products as instant coffee, soluble tea, nonfat milk and powdered egg are produced by this technique. The process has gained favor because: (1) rapid drying rates reduce the contact time between heat sensitive foods and heating medium, (2) commercial dryers have high product throughputs, (3) product characteristics are appealing and (4) spray drying is an efficient and relatively inexpensive process.

Although spray drying is a successful technique for drying many foods, its use in connection with fruit and vegatable materials has met with very limited success to date. Spray dried fruit and vegetable materials, such as orange juice powder, being highly heat sensitive and hygroscopic, cause difficulty, not only in handling the final product, but in the drying operation itself. For example, if orange juice powder is collected at a temperature above its sticky point, the powder coalesces. Coalescing also results if the dried product reabsorbs excessive moisture from the dryer outlet air stream. At inordinately high dryer air temperatures, heat damage is inflicted on the product. If undried powder impinges on the dryer wall or the wall temperature exceeds the sticky point temperature of the juice, a build up of powder is experienced. Thus far, these problems have not been solved for a pure orange juice product—the end result has inevitably been a sticky, caked product and/or a plugged dryer.

One proposed solution has been the use of food grade, water-dispersible protective colloids, e.g., dextrins, as drying aids. In the case of orange juice, commercially-available powders have included rather large colloid quantities, i.e., in excess of 50% by weight. While such quantities mitigate dryer plugging and product coalescing, the colloids are expensive and add a perceptible off taste which dilutes the organoleptic quality of the product.

Thus, there remains a need for a feasible, economical process for producing a free-flowing, spray-dried orange juice powder of superior quality.

SUMMARY OF THE INVENTION

In seeking to fulfill this need, the present invention offers a method comprising (a) providing an aqueous slurry including up to about 65% solids, about 50-85% of the solids being orange juice solids with the balance consisting essentially of a food grade, water-dispersible or water-soluble drying aid and (b) cocurrently spray drying said slurry to a powder having an average moisture content of less than about 4%, preferably less than about 2%, in a spray drying apparatus having a drying chamber and employing at least one high pressure spray nozzle, said spray drying being carried out at an inlet air temperature of about 220°-300° F, preferably 230°-280° F, an outlet air temperature of about 145°-205° F, preferably 155°-180° F, a nozzle pressure of up to about 5,000 psig, preferably greater than 3,000 psig, and a slurry feed rate of preferably less than about 45 gph, per nozzle, the interior walls of the drying chamber being maintained at a temperature of less than the sticky point temperature of the powder, preferably less than about 135° F, the angle of spray drying, preferably 50°-85°, and size of the drying chamber being selected in conjunction with the nozzle pressure to minimize any build up of undried orange juice powder on the walls of the drying chamber. Suitably, the slurry includes above about 50% solids, preferably less than about 60%, with the orange juice solids, advantageously substantially free of coarse orange pulp, comprising about 55-65% of the solids in the slurry. The slurry feed temperature preferably is less than about 150° F, more preferably about 40°-100° F.

To facilitate the drying process, the spray dryer may be provided with a bustle cone to reduce the residence time of lighter dried particles. Further, auxiliary apparatus may be desirable for mixing substantially dry cooler air, preferably having a temperature of about 40°-90° F, with the powder exiting from the bottom of the spray dryer to minimize final product moisture.

BRIEF DESCRIPTION OF THE DRAWING

These and other features and advantages of the invention will become more readily apparent from the following detailed description of various embodiments when taken in conjunction with the accompanying drawing which is a schematic of a preferred apparatus for carrying out the process of the invention.

DETAILED DESCRIPTION

Referring to the apparatus depicted in the drawing, an aqueous slurry containing orange juice solids is fed to storage tank 1 which preferably maintains the slurry at a suitable temperature for introduction into spray dryer 2. Pump 3 is provided to transport the slurry between the storage tank and spray dryer. A heated dry inlet air stream is introduced into the spray dryer via gas-fueled heater 4. The air cocurrently dries the slurry dispersed from high pressure nozzle 5 of the spray dryer to yield a dry product, the lighter particles of which are removed by a bustle cone (not shown) into cyclone 6. Heavier particles, requiring additional drying, exit from the bottom of the dryer together with a moisture-ladened outlet air stream. At junction 7, a secondary air stream is created via blower 8 which draws outside air through heat exchangers 9 and 10. In heat exchanger 9, the secondary air is cooled and the moisture therein condensed and removed. Heat exchanger 10 warms the secondary air to a temperature which is less than that of the outlet air. The secondary air stream then joins the outlet air stream from the dryer at junction 7 serving to cool and withdraw moisture from the entrained dried powder. The resulting air stream including the powder is combined with the product from cyclone 6 and fed to cyclone 11. The ultimate dried powder, after separation from the air stream, leaves the bottom of cyclone 11 via line 12. If desired, the air streams from both cyclones, lines 13 and 14, may be combined and treated to minimize air pollution, for example by passage through a wet scrubber, prior to discharge into the atmosphere.

As may be appreciated, many variations of this apparatus may be made. For example, the storage tank may be maintained under refrigerated conditions and the slurry may be heated by means of a heat exchanger prior to introduction into the spray dryer. While only one spray drying nozzle has been shown for convenience, additional nozzles may be desirable for increasing production capacity. Applicant has obtained superior results employing a bustle cone and a secondary air system; however, these features may be eliminated if one can tolerate a product of less exacting specifications.

In accordance with an embodiment of the invention, the slurry to be dried consists of water, orange juice solids and a food grade, water-dispersible or water-soluble drying aid. To provide a slurry of a sprayable viscosity and containing sufficient water to keep the dryer sufficiently cool, the slurry should include no more than about 65% by weight of solids. (All percentages expressed hereinafter are on a weight-to-weight basis.) On the other hand, the use of excessively low solids concentrations tends to decrease product throughput. Economic considerations and efficient operation dictate a preferred slurry concentration of above about 50%, most preferably 50–60% solids.

Of the solids, more than 50% but less than about 85% are orange juice solids with the balance being the drying aid. If lesser amounts of orange juice are employed, the rather expensive drying aid adds an undesirable off taste to the final product. At higher orange juice solids concentrations difficulties are encountered in dryer plugging and product coalescing. It has been determined that even for the most optimum drying conditions, the drying aid should be present in an amount of at least about 15%.

The orange juice solids may be provided in any convenient form so long as the ultimate concentration limitations are met. Applicant has found that the use of an orange juice concentrate produces a most suitable slurry. To minimize spray nozzle plugging, the solids preferably are substantially free of coarse orange pulp.

The drying aid may be any suitable food grade substance which facilitates drying, will not adversely react with orange juice and is either water dispersible or soluble. Typically, such aids are carbohydrates which have been referred to as "water-dispersible protective colloids"; however, this is a misnomer since water-soluble substances can equally serve the same purpose. For example, Maltrin-M100 (a trademark for a malto-dextrin of DE-10) with a true solubility of about 30% forms a clear solution up to 34–40% solids and yet is an excellent drying aid. Preferably, the drying aid will exhibit a low hygroscopicity, in the event of product exposure to a humid ambient. Especially suitable drying aids have been found to include Maltrin-M100 (mentioned above), Maltrin-M150 and Mor-Rex 1918 (the latter two being trademarks for malto-dextrins of DE-15 and DE-10, respectively.)

The selection of an appropriate temperature for the slurry feed represents a balance between viscosity, product abuse and cost. In the event the slurry is stored at an elevated temperature prior to introduction into the spray dryer, it is desirable that the temperature of the slurry not exceed about 150° F for even short periods of time (e.g., passage through heat exchangers). Exceeding even 100° F for more than one hour will perceptably abuse the product (through the Maillard reaction). At temperatures below about 40° F, the handling and drying of the slurry becomes difficult due to increased viscosity. Since the effects of the Maillard reaction are cumulative, storage at 40°–50° F is most desirable to minimize abuse. From a processing and economical viewpoint, the optimum temperature ranges between 70°–100° F. At these temperatures the slurry has an excellent viscosity and requires little, if any, thermal input. One possible approach for balancing these objectives is to store the slurry at a temperature of 40–50° F and employ a heat exchanger to heat the slurry to 70°–100° F prior to spraying. The ultimate selection of temperature, of course, is dependent upon the particular apparatus employed and the desired processing and product tolerances.

Turning to the spray drying of the product, per se, the basic guidelines fixing the operating parameters are as follows. The dryer should be free from detrimental wall build up and the resulting product should be a free-flowing, unabused powder. If the temperature of the dryer wall exceeds the sticky point of the dried orange juice powder, about 135° F when the drying aid is Maltrin-M100, the powder will melt and form a glassy coating. Should the powder contain too much moisture upon impact with the dryer wall, a sticky coating will result. Too much heat will abuse the product while too little will not effect a complete drying. An incompletely dried product, having above about 4% moisture, will not be free flowing. As can be appreciated, the processing parameters must be selected carefully.

In view of the heat sensitivity of orange juice, the inlet and outlet air temperatures must be carefully controlled to yield a free-flowing powder without abuse or wall build up. Inlet and outlet air temperatures of 220°–300° F and 145°–205° F, respectively, are suitable. At higher temperatures the product tends to abuse and will melt forming a glassy film on the dryer wall. It has been found that the dryer wall, if uninsulated, will be at a temperature below the sticky point of the powder if the permissible temperatures are not exceeded. With temperatures below those indicated, the tendency of the product is to remain undried, producing a sticky product which builds up on the dryer wall. The most optimum results have been obtained where the inlet and outlet air temperatures are, respectively, 230°–280° F and 155°–180° F.

The metes and bounds of air flow and slurry feed rates may be varied in accordance with well-known engineering principles to achieve acceptable results. Generally, the larger the air flow rate, the more desirable an increase the slurry feed rate is. A very acceptable air flow rate has been found to be about 10,000 standard cubic feet per minute (cfm). To secure reasonably complete drying, the slurry feed rate preferably is less than about 45 gallons per hour (gph) per nozzle. However, by employing higher air flow rates, higher slurry feed rates may be acceptable. Below about 15 gph, the process becomes costly due to reduced product throughput.

Spray dryers suitable for carrying out the process of the present invention most preferably include at least one high pressure spray nozzle. Depending upon desired product throughput and dryer capacity, additional nozzles may be employed. (An alternative is an appropriately selected centrifugal atomizer.)

The nozzle employed should project a spray pattern which will yield a droplet distribution permitting a proper drying of the product and, at the same time, avoid plastering the walls of the dryer at the pressures used in the process of the invention. Since mild drying conditions are used to minimize product abuse, a fine spray is desirable to increase the heat transfer area and thus the drying rate. A satisfactory spray may be obtained at nozzle pressures of up to 5,000 psig. If higher values are employed, the capacity of the dryer is exceeded or the droplet size is too small in which case too many fines result. This is undesirable since fine particles tend to abuse easily, are difficult to separate from the dryer air and generally cause problems in handling. If the pressure is too low, one must choose between an uneconomically low throughput per nozzle or an insufficiently dried product. A preferred lower nozzle pressure is about 3,000 psig.

Within the confines of these pressures, the angle of the spray must be sufficiently narrow relative to the dryer diameter to minimize the impingement of undried powder on the dryer wall. Conversely, the spray must not be so narrow as to preclude proper air to slurry contact and drying.

A preferred type of spray nozzle meeting the above requirements is of the core type. Such nozzles, e.g., are manufactured by Spray Systems Company as "Spraydry Nozzles." It has been found that "Spraydry Nozzles" from 60/17 to 80/216 (orifice/core size) produce desired spray patterns at the aforementioned pressures. Spray angles of these nozzles range from about 50° to 85°. Under the operating conditions of the invention, these nozzles were successfully used in dryers having diameters from 6 to 10 feet and free drying heights of from 12 to 30 feet. Larger dryers would be expected to product equally acceptable, if not superior, results.

The spray dryer produces a powder having a particle distribution ranging from coarse to fine. The lighter fine particles tend to become abused easily. Accordingly, it is preferred to employ a conventional bustle cone to decrease the residence time of these particles. A superior product is obtainable when between about 10 and 20% of the product is removed via the bustle cone with the remaining portion exiting from the bottom of the spray dryer.

This latter portion, being at a temperature of less than about 110° F and quite hygroscopic, will, upon cooling, absorb moisture from humid ambient air. To minimize this effect and produce a product of optimum dryness, a preferred embodiment calls for drawing in a portion of the outside air, condensing the moisture therein through cooling, reheating the air to a temperature of preferably about 40°-90° F and combining it with dryer outlet air containing the dried powder. This permits the powder to further cool without absorbing additional moisture.

In the preferred embodiment illustrated in the drawing, the powder removed through the bustle cone and that exiting from the bottom of the spray dryer are both subjected to cyclone separation. The ultimate product leaving from the last cyclone most suitably has a moisture content of less than about 4%. If the parameters of the present invention are not adhered to and this moisture content is exceeded, the product tends to be sticky and does not flow freely. From the standpoint of minimizing the Maillard reaction, which is accentuated by moisture, it is desirable to adjust the parameters or employ a supplemental drying step known in the art to achieve a moisture content of no greater than about 2%.

If the dried powder is exposed to the atmosphere for any length of time, a substantial moisture pick-up is inevitable. Accordingly, exposure should be avoided and the powder packaged immediately, preferably in the presence of a suitable dessicant.

The powder prepared according to the process of the invention may be used in any manner known to those skilled in the art. For example, the powder can be incorporated together with approrpiate flavorings, sugar and other ingredients to form a consumer shelf product.

The following examples of various embodiments are presented to further illustrate and exemplify the invention.

EXAMPLE 1

An orange juice slurry was dried using a Nerco-Niro spray dryer, No. 6819. The dryer, incorporating a centrifugal atomizer, was 4 ft. in diameter and 4 ft. high. The conditions used were:

| | |
|---|---|
| Slurry concentration | 52.5 |
| Orange Solids, wt % | 55 |
| Maltrin-M100 (DE-10), wt % | 45 |
| Inlet air temperature, ° F | 250 |
| Outlet air temperature, ° F | 194 |
| Feed temperature, ° F | 90 |
| Feed viscosity, cp | 125 |
| Feed rate, ml/min | 155 |
| Air flow rate, cfm | 300 |
| Atomizer speed, rpm | 20,000 |
| Insulation | No |

The resultant product was free flowing and quite satisfactory. Some wall build up was observed.

EXAMPLE 2

Using an insulated Proctor & Schwartz spray dryer having a diameter of 10 ft. and a height of 30 ft., an orange juice slurry was dried. The dryer was equipped with "Spraydry Nozzles" manufactured by Spraying Systems Company. The conditions were:

| | |
|---|---|
| Slurry concentration | 52.5 |
| Orange solids, wt % | 56 |
| Maltrin-M150 (DE-15), wt % | 44 |
| Inlet air temperature, ° F | 325 |
| Outlet air temperature, ° F | 185 |
| Feed temperature, ° F | 90 |
| Feed viscosity, cp | 125 |
| Feed rate, gph (water rating) | 50 |
| Nozzle(s) - three | ST 76/16 |
| Spray angle, ° | 67 |
| Atomizing pressure, psig | 4,000–5,000 |

The product, with a moisture content of 2% and having a good taste, exhibited a sticky consistency. Further, considerable build up was noted on the dryer wall. The primary reasons for these results were believed to be the high inlet air temperature and the insulated dryer wall which exceeded 135° F.

EXAMPLE 3

Employing the dryer of Example 2, but with a single "Spraydry Nozzle", an orange juice slurry was dried under the following conditions:

| | |
|---|---|
| Slurry concentration, wt % | 52 |
| Orange solids, wt % | 56 |
| Maltrin-M150 (DE-15), wt % | 44 |
| Inlet air temperature, ° F | 305 |
| Outlet air temperature, ° F | 190 |
| Feed temperature, ° F | 90 |
| Feed rate, gph | 40.8 |
| Nozzle(s) - one | ST 60/17 |
| Spray angle, ° | 82 |
| Atomizing pressure, psig | 4,000–5,000 |

While the resulting product was a fine powder of good taste having a moisture content of 2.07%, a substantial build up occurred on the dryer wall. Again, the insulated wall appears to have been a factor.

EXAMPLE 4

An orange juice slurry was dried with a DeLaval spray dryer, Type 72–12, having a 6 ft. diameter and 12 ft. height. In this and the remaining examples, all dryers were uninsulated, included bustle cones and secondary air systems, and were fitted with "Spraydry Nozzles" manufactured by Spraying Systems Company. The product was dried under the following conditions:

| | |
|---|---|
| Slurry concentration, wt % | 52 |
| Orange solids, wt % | 56 |
| Mor-Rex 1918 (DE 9-11), wt % | 44 |
| Inlet air temperature, °F | 280–300 |
| Outlet air temperature, °F | 180–190 |
| Feed temperature, °F | 86 |
| Feed viscosity, cp | 125 |
| Feed rate, gph (water rating) | 17.2 |
| Nozzle(s) - one | ST 71/216 |
| Spray angle, ° | 76 |
| Atomizing pressure, psig | 4,800 |

The product exhibited a moisture content of 1.96% and was free flowing. Very little wall deposition was observed.

EXAMPLE 5

Employing the dryer of Example 4, an orange juice slurry was dried as follows:

| | |
|---|---|
| Slurry concentration, wt % | 52 |
| Orange solids, wt % | 85 |
| Mor-Rex 1918 (DE 9-11), wt % | 15 |
| Inlet air temperature, °F | 240–270 |
| Outlet air temperature, °F | 165–175 |
| Feed temperature, °F | 86 |
| Feed viscosity, cp | 125 |
| Feed rate, gph | 12.6 |
| Nozzle(s) - one | ST 76/216 |
| Spray angle, ° | 67 |
| Atomizing pressure, psig | 4,500 |

Although the slurry was spray dried with some difficulty, the product obtained was very free flowing, excellent in appearance and contained only 2.98% moisture. No apparent off taste was noticed. A considerable amount of wall build up was encountered but a larger dryer would have minimized the problem.

EXAMPLE 6

A DeLaval spray dryer, Type 96–28, having an 8 ft. diameter and 28 ft. height was used to dry an orange juice slurry under the following conditions:

| | |
|---|---|
| Slurry concentration, wt % | 53 |
| Orange solids, wt % | 60 |
| Maltrin-M100 (DE-10), wt % | 40 |
| Inlet air temperature, °F | 240 |
| Outlet air temperature, °F | 180 |
| Feed temperature, °F | 85 |
| Feed viscosity, cp | 135 |
| Feed rate, gph | 41 |
| Nozzle(s) - one | ST 64/21 |
| Spray angle, ° | 67 |
| Atomizing pressure, psig | 3,800–3,900 |

The product exhibited a moisture content of 1.48% and was free flowing. Very little wall deposition was observed.

EXAMPLE 7

Orange juice slurries were dried in a series of five runs with a DeLaval spray dryer, Type 72–16, having a 6 ft. diameter and 16 ft. height. For all runs, the air flow rate was 10,000 cfm, the feed temperature was 90° F and the feed viscosity was 125 cp. The remaining conditions were as delineated in the following Table.

The product from all runs was found to be free flowing and of good taste. With the exception of Run 1, the wall build up was little, if any. The reason for the considerable wall build up of Run 1 was believed to be the excessive feed rate coupled with too small a dryer.

It will be understood that various changes in the details, materials, steps and arrangement of parts, which have been described and illustrated, may be made by those skilled in the art within the principle and scope of the invention as expressed in the apended claims. The foregoing description is considered to be only exemplary of the invention as defined in the appended claims.

TABLE

| Parameter | Run 1 | Run 2 | Run 3 | Run 4 | Run 5 |
|---|---|---|---|---|---|
| Slurry concentration, wt % | 52 | 52 | 52 | 60 | 60 |
| Orange solids, wt % | 60 | 60 | 60 | 60 | 60 |
| Maltrin-M100 (DE-10), wt % | 40 | 40 | 40 | 40 | 40 |
| Inlet air temperature, °F | 270 | 280 | 230 | 235 | 236 |
| Outlet air temperature, °F | 170 | 180 | 160 | 160 | 160 |
| Feed rate, gph | 21.6 | 13.3 | 10 | 10 | 8.1 |
| Nozzle(s) - one (ST) | 72/416 | 76/220 | 78/216 | 78/216 | 80/216 |
| Spray angle, ° | 66 | 64 | 60 | 60 | 54 |
| Atomizing pressure, psig | 4,000 | 4,000 | 4,800 | 4,800 | 5,000 |
| Moisture content, wt % | 3.2 | 3.0 | 3.0 | 2.8 | 3.0 |

I claim:

1. A method for producing a free-flowing orange juice powder having an improved flavor comprising:
   (a) providing an aqueous slurry including from about 51% to about 65% solids, not less than 51% and not more than about 85% of the solids being orange juice solids with the balance consisting essentially of a food grade, water-dispersible or water-soluble drying aid and
   (b) concurrently spray drying said slurry to a powder having a moisture content of less than about 4% in a spray drying apparatus having a drying chamber by passing said slurry through at least one high pressure spray nozzle, said spray drying being carried out at an inlet air temperature of about 220°–300° F, an outlet air temperature of about 145°–205° F and a nozzle pressure of from about 3,000 to about 5,000 psig, the interior walls of the drying chamber being maintained at a temperature of less than the sticky point temperature of the powder, the angle of spray drying and size of the drying chamber being selected in conjunction with the nozzle pressure to minimize any build up of undried orange juice powder on the walls of the drying chamber.

2. A method according to claim 1 wherein the sticky point temperature is about 135° F.

3. A method according to claim 1 wherein the orange juice solids comprise at least about 55% of the solids of the slurry.

4. A method according to claim 3 wherein the slurry feed rate is less than about 45 gph per nozzle.

5. A method according to claim 4 wherein the orange juice solids comprise about 55-65% of the solids of the slurry.

6. A method according to claim 5 wherein the inlet air temperature is about 230°-280° F and the outlet air temperature is about 155°-180° F.

7. A method according to claim 6 wherein the nozzle pressure is above about 3,000 psig.

8. A method according to claim 7 wherein the slurry feed temperature is less than about 150° F.

9. A method according to claim 8 wherein the slurry feed temperature is about 40°-100° F.

10. A method according to claim 9 wherein the slurry feed temperature and viscosity are about 90° F and 125 cps, respectively.

11. A method according to claim 9 wherein a bustle cone is employed in conjunction with the spray dryer to remove and thereby reduce the residence time of lighter dried particles of the orange juice powder.

12. A method according to claim 11 wherein substantially dry cooler air is mixed with the powder exiting from the bottom of the spray dryer to cool and further dry the powder.

13. A method according to claim 12 wherein the dry cooler air has a temperature of about 40°-90° F.

14. A method according to claim 13 wherein the slurry is dried to a powder having an average moisture content of no greater than about 2%.

15. A method according to claim 14 wherein the slurry is substantially free of coarse orange pulp.

16. A method according to claim 9 wherein the drying aid is a water-dispersible protective colloid.

17. A method according to claim 9 wherein the drying aid is a water-dispersible or water-soluble carbohydrate.

18. A method according to claim 9 wherein the drying aid is a dextrin.

19. A method according to claim 9 wherein the spray angle is about 50°-85°.

20. A method according to claim 1 wherein the slurry feed rate is less than about 45 gph per nozzle.

21. A method according to claim 1 wherein the slurry includes about 50-60% solids.

22. A method according to claim 1 wherein the orange juice solids comprise about 55-65% of the solids in the slurry.

23. A method according to claim 1 wherein the inlet air temperature is about 230°-280° F and the outlet air temperature is about 155°-180° F.

24. A method according to claim 1 wherein the nozzle pressure is above about 3,000 psig.

25. A method according to claim 1 wherein the slurry feed temperature is less than about 150° F.

26. A method according to claim 1 wherein the slurry feed temperature is about 40°-100° F.

27. A method according to claim 1 wherein the slurry feed temperature is about 70°-100° F.

28. A method according to claim 1 wherein the slurry feed temperature and viscosity are about 90° F and 125 cps, respectively.

29. A method according to claim 1 wherein a bustle cone is employed in conjunction with the spray dryer to remove and thereby reduce the residence time of lighter dried particles of the orange juice powder.

30. A method according to claim 1 wherein substantially dry cooler air is mixed with the powder exiting from the bottom of the spray dryer to cool and further dry the powder.

31. A method according to claim 14 wherein the dry cooler air has a temperature of about 40°-90° F.

32. A method according to claim 1 wherein the drying aid is a water-dispersible protective colloid.

33. A method according to claim 1 wherein the drying aid is a water-dispersible or water-soluble carbohydrate.

34. A method according to claim 1 wherein the drying aid is a dextrin.

35. A method according to claim 1 wherein the spray angle is about 50°-85°.

36. A method according to claim 1 wherein the slurry is dried to a powder having an average moisture content of no greater than about 2%.

37. A method according to claim 1 wherein the slurry is substantially free of coarse orange pulp.

* * * * *